United States Patent [19]

Ahmed et al.

[11] Patent Number: 4,968,351
[45] Date of Patent: Nov. 6, 1990

[54] NACREOUS PIGMENTS COLORED BY ADSORBED DYES

[75] Inventors: Wasi Ahmed, Lake Mohegan; Louis Armanini, Pleasantville, both of N.Y.

[73] Assignee: The Mearl Corporation, Ossining, N.Y.

[21] Appl. No.: 266,100

[22] Filed: Nov. 2, 1988

[51] Int. Cl.$^5$ .................. C09B 63/00; C04B 14/20
[52] U.S. Cl. ................... 106/402; 106/417; 106/436
[58] Field of Search ............ 106/402, 417, 426

[56] References Cited

U.S. PATENT DOCUMENTS

| | | | |
|---|---|---|---|
| 4,084,983 | 4/1978 | Bernhard et al. | 106/417 |
| 4,086,100 | 4/1978 | Esselborn et al. | 106/417 |
| 4,128,435 | 12/1978 | Baumer et al. | 106/417 |
| 4,309,480 | 1/1982 | Armanini | 106/417 |
| 4,323,554 | 4/1982 | Bernhard | 106/417 |
| 4,755,229 | 7/1988 | Armanini | 106/417 |

*Primary Examiner*—Theodore Morris
*Attorney, Agent, or Firm*—Ostrolenk, Faber, Gerb & Soffen

[57] ABSTRACT

Non-bleeding, non-agglomerated, lustrous colored nacreous pigments are prepared by admixing a laking reagent with an aqueous dispersion of a metal oxide coated substrate nacreous pigment and dyestuff.

20 Claims, No Drawings

NACREOUS PIGMENTS COLORED BY ADSORBED DYES

BACKGROUND OF THE INVENTION

Colored lustrous pigments are known in which the lustrous pigment part was natural pearlescent materials or synthetic pearlescent substances (also called nacreous pigments) and the colors were a wide variety of inorganic and organic coloring agents or dyestuffs. The processes used to make colored lustrous pigments in prior art encountered numerous difficulties among which the following are noteworthy: severe bleeding of the color on filtration of the coated product from the suspension; poor adherence of the dyestuff on the surface of the pigment such that the color could be washed off with water; difficulty of retaining luster with increased color intensity; and nonuniform distribution of the dyestuff on the pigment surface.

The foregoing problems are in part described in U.S. Pat. No. 4,084,983. This patent relates to the use of titanium dioxide-coated-mica pigments to produce colors due to interference phenomenon and additional color effects achieved by coating organic dyes on the surface of these pigments. In an attempt to overcome the problems encountered in the art, the dyestuff is chemically bound on the surface of the pigment with the help of a laking reagent. For example, one laking reagent used was aluminum chloride which on hydrolysis produced layers of aluminum hydroxide with which the dye reacted to form the insoluble color lake thereby permitting it to deposit on the surface of the pigment. Although this approach particularly addresses the problem of poor adherence of the organic dye on the surface of the pigment, the problem of heavy bleeding of the uncoated dye remains severe. The failure of the previous art to control this problem was a serious obstacle in developing a suitable process of preparing colored lustrous pigments of superior quality. This failure, as will be shown later, was the consequence of the inefficiency of the laking process, which resulted from the manner in which the laking was carried out and from the conditions maintained in the coating of the dye on the surface of the pigment.

There are important differences between the instant invention and U.S. Pat. No. 4,084,983. The latter employs a procedure in which the aluminum hydroxide is first deposited upon the platey pigment surface. In the instant invention, the reverse procedure is followed, i.e., the soluble dye is allowed to adsorb first on the platey pigment surface, followed by the addition of a soluble aluminum or zirconium compound to form the corresponding hydroxide precipitate, which completes the laking reaction. This method provides for an important improvement compared to that of U.S. Pat. No. 4,084,983. The latter suffers from heavy bleeding of the soluble dye whereas the present approach eliminates bleeding almost completely, which has the advantages that none of the dye material is wasted and that the soluble dye does not contaminate other equipment. A further important advantage is that it does not present a waste-treatment problem.

The second difference is that the laking reaction can be carried at relatively higher concentrations of reagents in contrast to the procedure of U.S. Pat. No. 4,084,983. For example, the aluminum or zirconium chloride reaqent, which is hydrolized, is used at a concentration of 20–30% instead of 2.4–5%. The reaction is carried out with pigment concentration of 20% w/v as compared to 2% in the procedure of U.S. Pat. No. 4,084,983. The combination of the substantially higher concentrations along with the reverse mode of addition of reagents helps to prevent dye bleeding. More significantly, and unexpectedly, the high concentration procedure leads to superior products.

The third notable difference is that in the instant invention, the laking reaction can be carried out at ambient (ca. 25° C.) temperature, whereas in U.S. Pat. No. 4,084,983 high temperatures in the range of 60°–90° C. are used for both the deposition of aluminum hydroxide and the precipitation of the dye. The higher temperature produces further bleeding and lowers the quality of the product. Laboratory experiments carried out to follow U.S. Pat. No. 4,085,983 resulted in severe bleeding of the dye and yielded products with poor reflectivity and evidence of agglomeration.

Finally, a significant contribution of the present invention is that it is not limited to the production of aluminum lakes. It has been found that lakes made from zirconium chloride are of comparable quality to those made from aluminum salts. Moreover, a lesser quantity of the zirconium chloride is necessary to carry out the laking process, because the tetravalent zirconium is more effective in precipitating the dyes. An additional advantage is that the precipitated zirconium lakes can be filtered more rapidly, making the process more efficient. As will be shown later, salts of other metals like calcium, barium, and strontium can also be used as laking reagents.

The main object of this invention is to develop an efficient laking process which is practical and economical for preparing dye-coated pigments with strong color intensity and superior luster. More specifically, one object, among others, of this invention is to provide a method of coating organic dyes on nacreous pigments whereby not only heavy bleeding is prevented but preferably even slight bleeding is not permitted in order that no trace of dye is found in the waste water system. This and other objects of the invention will become apparent to those skilled in the art from the following detailed description.

SUMMARY OF THE INVENTION

This invention relates to colored lustrous pigments of superior quality and to processes for producing them. More particularly, this invention relates to colored lustrous metal oxide coated substrate nacreous pigments colored with a dyestuff and a process for producing such pigments in which the dyestuff is adsorbed on the surface of the nacreous pigment aided by laking with aluminum hydroxide.

DESCRIPTION OF THE INVENTION

In accordance with the present invention, a superior adsorbed dye colored nacreous pigment is produced by contacting an aqueous dispersion of metal oxide coated substrate nacreous pigment with a solubilized dye and a laking reagent. The process of the present invention is similar to that of the aforementioned U.S. Pat. No. 4,084,983 in that some of the same reagents can be used to produce the same general type of product. However, the manner in which these reagents are used, the conditions maintained during the laking process, and the quality of reagents employed are significantly different, leading to significantly different results. The patent employs a two-step process in which aluminum hydroxide, for example, is first deposited on the platey surface of the pigment and thereafter the aluminum hydroxide coated pigment, with or without isolation from the suspension in which it is formed and resuspension, is reacted with a dye to form the insoluble color lake. This process depends on how well the dye binds to previously precipitated aluminum hydroxide on the pigment surface. Actually, the binding of the dye to form the color lake, by this method, becomes inefficient because of the loss of active sites as a result of the firmly adhering aluminum hydroxide layers already bound on the surface of the pigment. Fortunately, by following the reverse procedure it is possible to improve not only the efficiency of the laking process but also the quality of the product. In the present invention, an aqueous solution of the dye is combined with the nacreous pigment suspension and it has been found that when the pigment particles are allowed to settle out of suspension, they carry the dye molecules with them by physical adsorption such that much of the dye originally in solution is weakly adsorbed to the pigment particles. At this point in time the dye could be easily washed off the pigment surface with water. The laking reagent (e.g. a hydrolyzable aluminum compound) is added and the aluminum hydroxide precipitated on hydrolysis reacts with the already adsorbed dye to form a firmly adhering color lake on the surface of the pigment.

It is one advantage of the present invention that the physically adsorbed dye permits homogeneous precipitation because by its presence on the surface of the pigment it is able to direct its precipitation as the aluminum hydroxide is slowly formed at a controlled rate, and at the same time it is able to prevent the formation of agglomerates because the freshly generated aluminum hydroxide does not have a chance to diffuse and produce agglomerates, thus maintaining the homogeneity of the coating. An additional advantage of the present approach is that the freshly generated aluminum hydroxide has many more "active sites" which can react with the dye than the predeposited aluminum hydroxide bound on the surface of the pigment as in the previous art. This makes the present process not only economical because of a substantial saving in the amount of $AlCl_3.6H_2O$ used but also qualitatively superior because the less the amount of $AlCl_3.6H_2O$ used, the better the luster of the final product.

A further advantage of the present invention arises from the discovery that the use of high concentration of the pigment in the suspension containing the dye helps to eliminate bleeding completely for most dyes used and almost completely (>99.%) for some other dyes with the use of the appropriate amount of the laking reagent and the appropriate pH. It should be noted that the amount of dye coated on the final pigment depends upon the amount of laking reagent added. In principal, a calculated or an experimentally determined amount of the laking reagent should be capable of preventing bleeding. In practice, however, the prevention of bleeding by addition of large amounts of, e.g., aluminum chloride, produces agglomeration and consequent loss of luster in the final product. It has been found that a judicious balance between high pigment concentration and the amount of laking reagent prevents bleeding completely or almost completely. The high pigment concentration is generally to 20-30%, there being no advantage in using a higher concentration because of the high viscosity of the suspension as a consequence of which stirring becomes inefficient. The optimum amount of laking reagent like aluminum chloride has been experimentally determined to be only about 8% of the total weight of the pigment and about four times the amount of the dye (the corresponding aluminum hydroxide formed is found to be only about 1.33 times the amount of the dye). Moreover, this procedure not only prevents bleeding completely but also gives a product with improved luster.

The metal oxide coated substrate nacreous pigments are well known and are exemplified by titanium dioxide and/or zirconium dioxide coated mica. Such pigments are described, inter alia, in U.S. Pat. No. 3,437,515; 3,418,146; 3,087,828 and 4,038,099. The preferred nacreous pigment is titanium dioxide coated mica. The mica flake substrates generally have a length of about 1-75 microns, preferably about 5-35 microns, a thickness between about 0.03 and 3 microns and a specific surface area (BET) of about 1-6 $m^2g$, preferably about 2-4.5 $m^2/g$. Usually, the titanium dioxide or other metal oxide will be coated on the substrate surface to a thickness of about 20-350 millimicrons or such that it is about 50 to 500 $mg/m^2$. Depending on the thickness of the metal oxide coating, the pigments can exhibit interference or reflection colors of blue, green, yellow, red, etc.

In order to produce color effects in the pigment in addition to any interference colors, a large variety of organic dyes are available. The dyes which can be employed are those organic dyes which are solubilizable in aqueous media, some of which are shown in the following table and others of similar structure can be employed.

It is to be noted that all dyes used are intended for use in cosmetic makeup formulations, and as such, these dyes are recognized as certificable colors in the United States. As such, all are designated in the most recent nomenclature as DC or FDC followed by the designated color and a number. The products of this invention are intended for use in cosmetic makeup formulations, although these products need not be confined only to these applications.

TABLE 1

| DC/FDC No. | Chemical Identity | Structure |
|---|---|---|
| DC Red 6 (Lithol Rubin 13) | 4-(0-sulfo-p-tolylazo)-3-hydroxy-2-napthoic acid, disodium salt | $CH_3$—⟨⟩—N=N—⟨⟩ with $SO_3Na$, OH, COONa substituents on naphthalene |

TABLE 1-continued

| DC/FDC No. | Chemical Identity | Structure |
|---|---|---|
| DC Green 5 (Alizaria Cyanine Green F) | 2,2'-[9,10-dihydro-9,10-dioxo-1,4-anthracenediyl) dimino]bis[5-methyl benzenesulfonic acid] | |
| FDC Yellow 5 (Tartrazine) | 5-Oxo-1-(p-sulfo phenyl)-4-[p-sulfo-phenyl)azo]-2-pyrazoline-3-carborylic acid, trisodium salt | |
| FDC Yellow 6 (Sunset Yellow) | 1-p-sulfophenylazo-2-naphthol-6-sulfonic acid, disodium salt | |
| FDC Blue 1 (Brilliant Blue FCF) | Ethyl [4-[p-[ethyl (m-sulfobenzyl)amino-α-(09-sulfoamino]-α-0-phenyl)benzylidene]-2,5-cyclohexadiene-1-ylidene]m-sulfobenzyl) ammonium hydroxide, disodium salt | |
| DC Red 33 (Acid Fuchsine) | 8-amino-2-phenylazo-1-napthol-3,6-disulfonic acid, disodium salt | |
| FDC Red 40 (Allura) | 6-hydroxy-5-[(2-methoxyl-5-methyl-4-sulfonphenyl)-azo]-2-naphthalene-sulfonic aid, disodium salt | |

TABLE 1-continued

| DC/FDC No. | Chemical Identity | Structure |
|---|---|---|
| FDC Red 4 (Ponceau SX) | 3-[(2,4-dimethyl-5-sulfonphenyl)-azo]-4-hydroxy-1-naphthalene-sulfonic acid, disodium salt | |
| FDC Blue 2 (Indigotine) | 5,5'-disulfo-3,3'-dioxo-$\Delta^{2,2'}$-biindoline, disodium salt | |
| FDC Green 3 (Fast Green FCF) | 4-[[4-(N-ethyl-m-sulfonbenzylamino) phenyl] (4-hydroxy-2-sulfonium phenyl) methylene]-[1-(N-ethyl-N-m-sulfobenzyl) $\Delta^{2,5'}$-cyclohexadienimine], disodium salt | |
| DC Green 8 (Pyranine Concentrated) | 8-hydroxy-1,3-6-pyrenetrisulfonic acid, trisodium salt | |
| DC Orange 4 (Orange II) | 1-p-sulfophenyl azo-2-naphthol, monosodium salt | |
| DC Red 8 (Lake Red C) | 1-(4-chloro-0-sulfo-5-tolylazo)-sulfo-2-naphthol, monosodium salt | |
| DC Yellow 10 (Quizoline Yellow) | 2-(2-quinolyl)-1,3-indandione disulfonic acid, disodium salt | |

TABLE 1-continued

| DC/FDC No. | Chemical Identity | Structure |
| --- | --- | --- |
| Ext DC Violet 2 (Alizarin Violet) | 2-[(9,10-dihydro-4-hydroxy-9,10-dioso-1-anthracenyl)amino]-5-methylbenzene sulfonic acid, monosodium salt | |
| Ext DC Yellow 7 (Naphthol Yellow S) | 8-hydroxy-5,7-dinitro-2-naphthalenesulfonic acid, monosodium salt | |
| DC Brown 1 (Resorcin Brown) | 4[[5-(dialkylphenyl)-azo]-2,4-dihydroxy phenyl]azo]-benzene-sulfonic acid, monosodium salt | |

In the following description, the metal oxide coated substrate nacreous pigment will be described for convenience as titanium dioxide coated mica, it being understood that other metal oxide coated substrate nacreous pigments can also be used. In the process, an aqueous dispersion of the titanium dioxide coated mica and dye is provided. The dispersion can be formed by adding the dye to an aqueous suspension of the titanium dioxide coated mica. In the preferred process, the titanium dioxide-coated mica is dispersed in a solution of the dye itself and a known volume of distilled water to give an appropriate concentration of the pigment and the dye. Although it is not practical to use high concentrations like 40–50% of pigment, as noted before, it is found to be advantageous to use about 20–30% pigment concentrations. The pH of the dispersion is adjusted to the coating pH before the coating is initiated. Since the pH of the dispersion is normally higher than the coating pH, it can be brought down to the coating pH with the laking reagent itself when there will be in situ generation of acid. It should be noted that the importance of pH in the laking process was not completely recognized in the past because the fact was ignored that $AlCl_3.6H_2O$ on hydrolysis forms a large variety of oligomeric and polymeric species, the nature of which depends on the pH, which in turn affects the quality of the product. The best pH for the coating process using an aluminum laking reagent was found to be about 5.0. Any pH below or above about 5.0 gives less coating of the dye, hence bleeding, and lower luster in the final product. It is believed that at this optimum pH of 5.0 maximum formation of insoluble aluminum hydroxide sol with finely divided particles takes place which gives rise to the homogeneous precipitation of the dye, and which in turn produces better luster in the final product. However, the coating may be done in the pH range of 4.5–7.0 with some loss in the quality of the product above or below pH of 5.0.

Although the laking reagent most commonly used is aluminum chloride, other salts of aluminum such as aluminum sulfate or potassium aluminum sulfate can be used with the same effect. No appreciable difference in the quality of the product is observed with the difference in the nature of the anion. It has been found advantageous to use an aluminum laking reagent containing about 20–30% $AlCl_3.6H_2O$ whereby the higher concentration of the added reagent maintains a low volume of the dispersed aqueous system. Simultaneous addition of a base, preferably 5–10% sodium hydroxide, is required to maintain a constant pH throughout the coating, while the pigment suspension is continuously stirred.

In the present invention, the coating of the dye is preferably carried out at room temperature. It is found that there is no particular advantage in heating the pigment dispersion at higher temperatures like 40°–70° C. and particularly at high temperatures like 85°–90° C. as in U.S. Pat. No. 4,084,983. The heating is actually a disadvantage because as the temperature increases, so does the bleeding. At 85°–90° C., the bleeding is so heavy that an enormous amount of laking reagent is required to prevent it. Moreover, there is significant loss in luster with increase in temperature. Although the bleeding can be prevented by using a high concentration of laking reagent, it is obviously advantageous to use the lowest temperature and smallest amount of reagent which are able to prevent bleeding and at the same time maintain high luster. As an example, by employing the present method of coating at 25° C. it is possible to coat 99.8% of the added dye, whereas on repeating the previous art process under similar conditions but higher temperature of 90° C., only 35% of the added dye coated. The color intensity of the latter product was obviously quite low compared to the former. In U.S. Pat. No. 4,084,983, the assumption was made that a higher temperature during the laking process had a good effect on the quality of the product. It has been found, however, that the best products are obtained in the room temperature region of about 25°–35° C. and higher temperatures actually have pronounced deleterious effect on the luster of the final product.

The pigment suspension with the coated dye is preferably stirred at a moderate speed after the addition of reagents to ensure completion of the coating process. The final product after filtration, washing and drying shows brilliant color intensity and high luster even with as low as about 1 to 2% dye coating on the basis of the pigment weight. Products with exceptionally bright colors, and surprisingly with no significant loss in luster, can be obtained by coating about 4–5% or more dye through this invention.

Colored lustrous pigments can be made by laking with metals other than aluminum, depending on the dye. Zirconium tetrachloride is able to precipitate all of the dyes of Table I. However, Ca, Ba and Sr chlorides are able to lake only the DC Red 6 in Table I.

The fact that divalent ions like $Ca^{+2}$, $Ba^{+2}$ and $Sr^{+2}$ are able to complex the red dye gives rise to an important part of the invention. The complexes are fortunately insoluble in aqueous systems and therefore do not give rise to bleeding problems. More importantly, the properties of the complexes depend upon the nature of the ion employed to form them. Thus the Ca, Ba and Sr lakes of the red dye in the present invention are colors of outstanding brilliance and smooth luster, clearly different from aluminum and zirconium lakes. The calcium lake deposited on the titanium dioxide-coated-pigment has a strong pink color (with 2% dye). The barium is more towards orange with an unusually soft texture of the powder and the strontium lake has a deep red color.

The coating process with zirconium tetrachloride as the laking reagent is basically the same as that employed for aluminum chloride except that the pH should be maintained at about 4.0 throughout the coating process. However, the coating may be done at pH in the range of about 3.0–4.5 without any deleterious effect.

The coating process using calcium, barium and strontium chlorides as the laking reagent is slightly modified with respect to the process with aluminum and zirconium chlorides. Whereas an excess of latter should be avoided because it causes agglomeration in the final product, the former can be added in excess (ca 2–3 times) with good results. On the addition of this excess of the divalent metal salts, the pH of the dispersion (which contains the pigment and the dye) goes down only slightly from 5.0 to 4.7 which can be adjusted back to 5.0 with a small quantity of base. Obviously, simultaneous addition of base is not necessary in the case of divalent metal ions as it is in the case of aluminum and zirconium chlorides which hydrolyze to produce an acid solution which in turn must be continuously neutralized with a base.

A further important aspect of the invention is that a similar laking procedure as used to make colored lustrous pigments can be utilized to make products with two-color effects by simply using different combinations of titanium dioxide-coated-mica pigments and organic dyes.

The products of the present invention are colored lustrous pigments of superior quality in that they possess strong color intensity, high luster and soft texture of the powder.

This invention produces a new series of lustrous pigments. They derive color from both light interference and light absorption. The combination of these two-color-producing mechanisms results in a unique double color. In each double color, the pigment particle consists of titanium dioxide-coated-mica which produces the reflection color, which is seen as a colored highlight. The added colored component, the organic dye, imparts its own unique second color by light absorption; this is the background color.

The procedure to make the products with two-color effects is essentially as that employed for the colored lustrous pigments as described before. Again a high concentration of pigment in the aqueous suspension is an advantage—30% can be used with good results. The coating pH, however, is varied from about 5–7.0 to produce a variety of color effects. The amount of dye deposited on the surface of the pigment is an important factor in producing desired products with proper color effects. The amount is usually about 0.5–6%, preferably about 1–5% of the pigment weight. A higher percentage has a tendency to mask the original reflection highlight color. Table II below sets forth some of the products with two-color effects that can be obtained by the method described in this invention. Other products with desired color effect can be obtained by utilizing the present invention by those skilled in the art.

The invention is illustrated but in no way limited by the following examples, in which all percentages are by weight unless otherwise stated.

EXAMPLE I 250 g of a titanium dioxide-coated mica pigment with red interference reflection color (~44% $TiO_2$) were dispersed in 500 ml 0.5% of a red dye (disodium salt of 4-(o-sulfo-p-tolylazo)-3-hydroxy-2-naphthoic acid also called Lithol Rubine B) solution. 250 ml of distilled water were added, while stirring. The pH was adjusted by 5.0 with 1% aluminum chloride solution. 100 ml of 20% aluminum chloride solution was then added at a rate of 1.0 ml per minute with simultaneous addition of 5% sodium hydroxide solution to maintain the pH at 5.0. The stirring was continued for an additional half hour. The suspension was allowed to settle and filtered. The solid cake was washed with water until no chloride was detected in the filtrate. The bright red product was dried at 120° C. for three hours. The resulting product contained 2% red adsorption colorant and showed red interference color.

EXAMPLE II

The procedure of Example I was repeated except that a gold reflecting titanium dioxide coated mica pigment containing approximately 36% $TiO_2$ was used as substrate and the yellow adsorption color was produced by 5-oxo-1-(p-sulfo-phenyl)-4-[(p-sulfophenyl)azo]-2-pyrazoline-3carboxylic acid, also called Tartrazine. The resulting product contained 2% yellow adsorption color with strong color intensity and with gold luster.

EXAMPLE III

The procedure of Example I was repeated except that a blue reflecting titanium dioxide coated mica with 47% $TiO_2$ was used as substrate and the blue adsorption color was produced by triphenyl-methane-trisulfonic acid dye also called Food Blue 2 or Brilliant Blue FCF. The resulting product contained 2% blue adsorption color with strong color intensity and with blue luster.

EXAMPLE IV

The procedure of Example I was repeated except that a green reflecting titanium dioxide-coated-mica containing 50% $TiO_2$ was used as the substrate and the green adsorption color was produced by 2,2'-[(9,10-dihydro-9,10-dioxo-1,4-anthracenediyl)diimino] bis [5-methylbenzenesulfonic acid], also called Acid Green 25. The resulting product contained 2% green as adsorption color with green interference luster.

EXAMPLE V

The procedure of Examples I—IV was repeated to coat 4% of the appropriate color on the titanium dioxide-coated-mica. For a 250 grams quantity of pigment, 1,000 ml of 0.5% dye was used and 400 ml of 20% $AlCl_3.6H_2O$ was added with simultaneous addition of 5% NaOH to maintain pH constant at 5.0. The resulting products exhibited outstanding brilliance of color with good luster.

The next four examples illustrate the preparation of colored lustrous pigments of unusually superior quality by employing laking reagents other than aluminum chloride. Chlorides of calcium, barium, strontium and zirconium were used.

EXAMPLE VI 50 grams of a red reflecting titanium dioxide-coated-mica were dispersed in 100 ml of 0.5% red dye 4-(o-sulfo-p-tolylazo)-3-hydroxy-2-naphthoic acid (DC Red 6). 50 ml distilled water was added to give a 20% aqueous dispersion of the pigment. The pH was adjusted to 5.0 with 1% HCl. 50 ml of 20% $CaCl_2.2H_2O$ solution was added continuously at a rate of 1.0 ml per minute, while the dispersion was stirred. The pH went down only slightly and was brought back to 5.0 with a few drops of base. After addition was complete, the dispersion was stirred for an additional ½ hour. It was allowed to settle and filtered. The solid on the filter paper was washed until no chloride ions were found in the filtrate. The solid was dried at 120° C. for three hours. The resulting product had a strong pink adsorption color with a red luster. The powder had a soft, smooth texture.

EXAMPLE VII

The procedure of Example VI was repeated except 50 ml of 20% $BaCl_2$ solution was used to produce a barium lake. The resulting product had a strong orange adsorption color with a smooth red luster. The powder had an extremely soft, smooth texture.

EXAMPLE VIII

The procedure of Example VI was repeated except 50 ml of 20% $SrCl_2$ solution was used to produce a barium lake. The resulting product had a deep red adsorption color with a red luster.

EXAMPLE IX

To prepare a zirconium lake, the procedure of Example VI was modified as follows.

50 grams of the titanium dioxide-coated-mica were dispersed in 200 ml of the appropriate 0.5% dye to match the interference color. 50 ml of distilled water was added to produce a 20% dispersion of the pigment. The pH was adjusted to 4.0 with 1% HCl. 20 ml of 20% $ZrCl_4$ solution (aqueous) was added at a rate of 0.5 ml per minute with simultaneous addition of 5% NaOH solution to maintain the pH at 4.0. After the addition was complete, the suspension was stirred for an additional ½ hour. It was allowed to settle, filtered and the solid washed with water until no chloride was found in the filtrate. The solid was dried at 120° C. for 3 hours. The resulting product had a red adsorption color with a red luster.

The next four examples illustrate the preparation of colored lustrous pigments with two-color effects.

EXAMPLE X 10 grams of a red reflecting titanium dioxide-coated-mica were dispersed in 25 ml distilled water. 2.0 ml of 20% yellow dye (tartrazine) was then added. The pH was adjusted to 7.0. 4.0 ml of 30% $AlCl_3$ was added with simultaneous addition of 10% NaOH solution to maintain pH constant at 7.0. Stirring was continued for an additional period of 30 minutes. The suspension was allowed to settle, then filtered, the solid washed with water and dried at 120° C. The product had a yellow adsorption color with red interference luster. A similar procedure was used to obtain the blue and green adsorption colors on the same red reflecting titanium dioxide mica. Table II summarizes the products with two-color effects.

EXAMPLE XI

The procedure of Example X was repeated except that a gold reflecting titanium dioxide-coated-mica pigment was used as substrate and the red (DC Red 6), blue (FDC Blue 1) and green (DC Green 5) dyestuffs in Table I were used as the dye. Table II summarizes the resulting products with these two-color effects.

EXAMPLE XII

The procedure of Example X was repeated except that a blue reflecting titanium dioxide-coated-mica was used as a substrate and the red (DC Red 6), yellow (FDC Yellow 5) and green (DC Green 5) dyestuffs of Table I were used as the dye. Table II summarizes the resulting products with these two-color effects.

EXAMPLE XIII

The procedure of Example X was repeated except that a green reflecting titanium dioxide-coated-mica was used as a substrate and the red (DC Red 6), yellow (DC Yellow 5) and blue (FDC Blue 1) dyestuffs in Table I were used as the dye. Table II summarizes the resulting products with these two-color effects.

TABLE II

| Example No. | Highlight (Reflection Color) | Background (Absorption Color) | Powder Color |
|---|---|---|---|
| X | Red | Yellow | Orange-Yellow |
| X | Red | Blue | Reddish-Blue |
| X | Red | Green | Reddish-Green |
| XI | Gold | Red | Brick Red |
| XI | Gold | Blue | Bluish-Gray |
| XI | Gold | Green | Bluish-Green |
| XII | Blue | Red | Bright Pink |
| XII | Blue | Yellow | Buff Yellow |
| XII | Blue | Green | Bluish-Green |
| XIII | Green | Red | Purple |
| XIII | Green | Yellow | Bright Yellow |
| XIII | Green | Blue | Bluish Green |

Various changes and modifications can be made in the process and products of this invention without departing from the spirit and scope thereof. The various embodiments which have been described herein were for the purposes of illustration only, and were not intended to limit the invention.

What is claimed is:

1. A method of producing an adsorbed dye colored nacreous pigment which comprises absorbing a soluble organic dyestuff at a coating pH on the surface of a metal oxide coated substrate nacreous pigment in an aqueous dispersion and subsequently absorbing a laking reagent thereon.

2. The method of claim 1, wherein the nacreous pigment concentration in said dispersion is about 20–30% by weight.

3. The method of claim 2, wherein the laking reagent is an aluminum, zirconium, calcium, barium or strontium laking reagent and the coating pH is about 4.5 to 7.

4. The method of claim 3, wherein the coating pH is about 5.

5. The method of claim 2, wherein the admixture is effected at about room temperature.

6. The method of claim 2, wherein said aqueous dispersion contains about 0.5–6% of dyestuff based on the weight of said pigment.

7. The method of claim 2, wherein said laking reagent is a hydrolyzable aluminum compound which is added to said aqueous dispersion over a finite period of time, the initial rate of addition being sufficient to adjust the pH to a coating pH of about 4.5–7 and thereafter the rate is sufficient to maintain the pH at about said coating pH.

8. The method of claim 7, wherein the laking reagent is aluminum chloride and the initial rate of introduction thereof is maintained until the coating pH is about 5.

9. The method of claim 2, wherein the laking reagent is a zirconium laking reagent and the coating pH is about 3–4.5.

10. The method of claim 2, wherein the colors of said nacreous pigment and said dyestuff are different.

11. The method of claim 10, wherein said laking reagent is an aluminum, zirconium, calcium, barium or strontium laking reagent, the coating pH is about 5–7 and said dispersion contains about 1–5% dyestuff based on the weight of said pigment.

12. A non-bleeding, non-agglomerated, cosmetic grade lustrous colored nacreous pigment comprising metal oxide coated substrate nacreous pigment particles whose surface has a uniformly distributed adsorbed soluble organic dyestuff, said dyestuff having fixed on its surface a dyestuff lake.

13. The non-bleeding, non-agglomerated, lustrous colored nacreous pigment of claim 12, wherein said nacreous pigment is titanium dioxide coated mica.

14. The non-bleeding, non-agglomerated, lustrous colored nacreous pigment of claim 13, wherein said dyestuff lake is an aluminum, calcium, barium, strontium or zirconium lake.

15. The non-bleeding, non-agglomerated, lustrous colored nacreous pigment of claim 14, wherein said dyestuff is about 0.5–6% based on the weight of said pigment.

16. The non-bleeding, non-agglomerated, lustrous colored nacreous pigment of claim 15, wherein said dyestuff lake comprises aluminum hydroxide.

17. The non-bleeding, non-agglomerated, lustrous colored nacreous pigment of claim 16, wherein said nacreous pigment and said dyestuff are of different color.

18. The non-bleeding, non-agglomerated, lustrous colored nacreous pigment of claim 17, wherein said dyestuff is about 1–5% based on the weight of said pigment.

19. The non-bleeding, non-agglomerated, lustrous colored nacreous pigment of claim 13, wherein said dyestuff is selected from the group consisting of DC Red 6, DC Green 5, FDC Yellow 5, FDC Yellow 6, FDC Blue 1 and FDC Red 40 and wherein said dyestuff lake comprises aluminum hydroxide.

20. The method of claim 1, wherein said dyestuff is selected from the group consisting of DC Red 6, DC Green 5, FDC Yellow 5, FDC Yellow 6, FDC Blue 1 and FDC Red 40, wherein said dyestuff lake comprises aluminum hydroxide and wherein said metal oxide coated substrate nacreous pigment is titanium dioxide coated mica.

* * * * *